US008218177B2

(12) United States Patent
Lazarus

(10) Patent No.: US 8,218,177 B2
(45) Date of Patent: *Jul. 10, 2012

(54) RESOURCE MANAGEMENT PROFILES

(75) Inventor: Lewis J Lazarus, Torrance, CA (US)

(73) Assignee: Xerox Corporation, Norwalk, CT (US)

( * ) Notice: Subject to any disclaimer, the term of this patent is extended or adjusted under 35 U.S.C. 154(b) by 1222 days.

This patent is subject to a terminal disclaimer.

(21) Appl. No.: 11/937,810

(22) Filed: Nov. 9, 2007

(65) Prior Publication Data

US 2009/0125911 A1 May 14, 2009

(51) Int. Cl.
*G06F 3/12* (2006.01)

(52) U.S. Cl. ...... 358/1.15; 358/1.16; 358/442; 715/764; 718/104; 379/100.17; 709/228

(58) Field of Classification Search ................ 358/1.15, 358/1.16, 1.14, 442, 402, 448; 715/104, 715/764; 718/104; 379/100.17; 709/228, 709/218

See application file for complete search history.

(56) References Cited

U.S. PATENT DOCUMENTS

| | | | |
|---|---|---|---|
| 5,535,312 A | 7/1996 | Hammer et al. | |
| 5,717,842 A | 2/1998 | Ambalavanar et al. | |
| 5,745,652 A | 4/1998 | Bigus | |
| 5,867,495 A * | 2/1999 | Elliott et al. | 370/352 |
| 6,452,692 B1 | 9/2002 | Yacoub | |
| 6,516,350 B1 | 2/2003 | Lumelsky et al. | |
| 6,591,262 B1 * | 7/2003 | MacLellan et al. | 1/1 |
| 6,898,602 B2 | 5/2005 | Sayah | |
| 6,970,259 B1 * | 11/2005 | Lunt et al. | 358/1.14 |
| 7,043,321 B2 * | 5/2006 | Ruml et al. | 700/100 |
| 7,080,892 B2 * | 7/2006 | Moriyama et al. | 347/5 |
| 7,110,541 B1 * | 9/2006 | Lunt et al. | 380/51 |
| 7,474,424 B2 * | 1/2009 | Hokiyama | 358/1.15 |
| 7,512,903 B2 | 3/2009 | Hudson, Jr. | |
| 7,639,381 B2 * | 12/2009 | Shima | 358/1.15 |
| 7,710,586 B2 * | 5/2010 | Lazarus | 358/1.14 |
| 7,813,822 B1 * | 10/2010 | Hoffberg | 700/94 |
| 7,912,388 B2 * | 3/2011 | Toda | 399/45 |
| 7,990,553 B2 * | 8/2011 | Aritomi et al. | 358/1.14 |
| 8,010,942 B1 * | 8/2011 | Mirza et al. | 717/109 |
| 2002/0053011 A1 | 5/2002 | Aiken et al. | |
| 2004/0095602 A1 | 5/2004 | Sugishita et al. | |
| 2004/0141203 A1 * | 7/2004 | Honma | 358/1.15 |
| 2004/0196493 A1 | 10/2004 | Christiansen et al. | |

(Continued)

OTHER PUBLICATIONS

U.S. Appl. No. 11/937,793, filed Nov. 9, 2007, Lewis J. Lazarus.

*Primary Examiner* — Negussie Worku
(74) *Attorney, Agent, or Firm* — MH2 Technology Law Group LLP

(57) ABSTRACT

A resource management graphical user interface for a computer-controlled printing system in a networked environment enables an operator to create, modify, and apply resource management profiles to coordinate resource allocation within the printing system. The user interface displays a current resource management profile, which includes printing system resource allocations associated with specific tasks. A resource profile list includes at least one profile name, corresponding to a task type. Profiles associated with the task type are presented and controls are provided to enable the operator to set allocations for component resource usage. The operator is also presented with operational options, including deleting a profile, approving a profile, applying a profile to a print job or series of print jobs, saving a new profile, replacing an existing profile, and canceling a profile modification. The user interface transmits instructions to apply a profile to a printing system for processing of print jobs.

25 Claims, 5 Drawing Sheets

U.S. PATENT DOCUMENTS

| | | |
|---|---|---|
| 2005/0007627 A1* | 1/2005 | Ha .............................. 358/1.15 |
| 2005/0055476 A1* | 3/2005 | Aschenbrenner et al. ...... 710/15 |
| 2005/0149940 A1 | 7/2005 | Calinescu et al. |
| 2006/0050313 A1* | 3/2006 | Hashimoto et al. .......... 358/1.15 |
| 2006/0265738 A1 | 11/2006 | Chrysanthakopoulos et al. |
| 2007/0127053 A1* | 6/2007 | Tominaga .................... 358/1.14 |
| 2007/0268512 A1* | 11/2007 | Sakakibara .................. 358/1.14 |
| 2007/0273917 A1* | 11/2007 | Encrenaz et al. ............ 358/1.15 |
| 2009/0125910 A1 | 5/2009 | Lazarus |
| 2010/0097661 A1* | 4/2010 | Hoblit ........................... 358/405 |

* cited by examiner

RESOURCE MANAGEMENT PROFILES

CROSS-REFERENCE TO RELATED APPLICATIONS

The following co-pending application, U.S. application Ser. No. 11/937,793, filed Nov. 9, 2007, titled "System-Generated Resource Management Profiles", is assigned to the same assignee of the present application. The entire disclosure of this co-pending application is totally incorporated herein by reference in its entirety.

BACKGROUND AND SUMMARY

This disclosure relates generally to computer controlled systems for digital document processing within a networked environment, and more particularly to a system and method in which an operator creates and specifies resource management profiles for optimization of resource utilization for various printing tasks.

In the area of digital printing and copying, various approaches have been applied in an attempt to optimize resource utilization for digital printing tasks. One such approach is dynamic memory allocation, which is the allocation of memory storage for use in a specific purpose or job during the runtime of that job. It is a way of distributing ownership of limited memory resources among many pieces of data and code. This approach works well for relatively small blocks of memory, or when memory does not have to be contiguous. However, it does not work well when it is necessary to reserve large, contiguous areas in memory for various purposes.

Another approach is trial and error, in which the size of large static memory allocations is determined independently, based on the needs of various system components, without consideration of the system as a whole. In this case, developers must make manual adjustments to the size of specific memory pools to address performance or related problems. Yet another approach is user level tools and interfaces. Such tools allow the user to adjust allocations for specific features, but typically require a high skill level, are not coordinated across components, and only allow one feature at a time to be adjusted. System administrators often must use these tools on a trial and error basis. An alternate approach is application of a resource budget. Based on expected system use, internal software assigns a percentage of memory, or other resources, to each component. This works well for systems with consistent patterns of resource use, but can be very inefficient for systems, such as high end printing systems, with large variations in usage patterns between sites or applications.

It would be useful to have a resource management approach that would allow an operator to enable or disable specific features to provide resource allocation. Such an approach would enable more efficient use of resources, such as memory, within high end printing systems, and would provide for coordinated allocations across components. This would avoid the problems associated with trial and error allocations and the need to reserve memory for various purposes. Additionally, it would provide effective utilization of resources in those situations in which there are large variations in usage patterns or applications.

All U.S. patents and published U.S. patent applications cited herein are fully incorporated by reference. The following patents or publications are noted.

U.S. Patent Application Publication No. 2005/0149940 to Calinescu et al. ("System Providing Methodology for Policy-Based Resource Allocation") describes a system for allocating computer resources among a plurality of applications based on a policy. The system includes a plurality of computers connected to one another through a network and a policy engine for specifying a policy for allocation of resources of the plurality of computers among a plurality of applications having access to the resources. A monitoring module at each computer detects demands for the resources and exchanges information regarding demands for the resources of the computers. An enforcement module at each computer allocates the resources among the plurality of applications based on the policy and information regarding demands for the resources.

U.S. Patent Application Publication No. 2004/0095602 to Sugishita et al. ("Multifunction Peripheral with Efficient Use of Memory Resources") describes an image forming apparatus that includes an off-line unit which places one or more processes in an off-line state in which restriction is placed on running of the processes. A memory area releasing unit releases one or more memory areas used by the processes that are in the off-line state, and a data unit places data in the memory areas released by the memory area releasing unit.

U.S. Pat. No. 5,717,842 to Ambalavanar et al. ("Method of Managing Memory Allocation in a Printing System") describes a method of managing memory allocation in a printing system including the steps of creating a plurality of blocks and designating each block with an identifier. In response to a request from a component, a first set of identifiers, corresponding to a first set of blocks, is placed into a database by a resource manager. The component then accesses the database and, by reference to the first set of identifiers, begins filling up the first set of blocks with image data. As each block is filled, the client transmits an interrupt signal to a controller. After a predesignated one of the first set of blocks has been filled, the controller causes the resource manager to place a second set of identifiers in the database so that the client can access the second set of identifiers as soon as it has completed filling the first set of blocks.

The disclosed embodiments provide examples of improved solutions to the problems noted in the above Background discussion and the art cited therein. There is shown in these examples an improved resource management graphical user interface for a computer-controlled printing system in a networked environment to enable an operator to create, modify, and apply resource management profiles to coordinate resource allocation within the printing system. The user interface displays a current resource management profile, which includes printing system resource allocations associated with specific tasks. A resource profile list includes at least one profile name, corresponding to a task type. Jobs associated with the task type are presented and controls are provided to enable the operator to set allocations for component resource usage. The operator is also presented with operational options, including deleting a profile, approving a profile, applying a profile to a print job or series of print jobs, saving a new profile, replacing an existing profile, and canceling a profile modification. The user interface transmits instructions to apply a profile to a printing system for processing of print jobs.

In an alternate embodiment there is disclosed a method for computer control of collaborating devices in a networked environment, enabling an operator to access a resource management graphical user interface to create, modify, and apply resource management profiles to coordinate resource allocation among the collaborating devices. The method includes reviewing a current resource management profile having resource allocation settings associated with specific tasks. A determination is made as to whether the current profile settings are adequate to efficiently perform a job. If the current profile settings are adequate, the device is instructed to apply the profile to the specifications for the job. This causes the collaborating device to free previously allocated resources, determine component resource allotments based on the selected profile, allocate resources for components based on the resource allotments, and perform a job using the selected profile based resource allocations. If the current profile settings are not adequate to efficiently perform the job, an alternate profile is identified. The operator requests a profile list display, which includes various profile names, which are associated with a task type. The profiles associated with the profile name are reviewed and a determination is made whether a specific profile satisfies the profile setting requirements for the job. If so, the profile is selected and the device is instructed to apply the selected profile to the specifications for the job. If none of the profiles associated with a profile name satisfy the profile setting requirements for the job, a new profile is created.

In yet another embodiment, there is disclosed a system for computer control of collaborating devices to enable an operator to access a resource management graphical user interface to create, modify, and apply resource management profiles to coordinate resource allocation among the collaborating devices. The system provides capability for reviewing current resource management profiles and determining whether a current profile setting are sufficient to efficiently perform a job. If the current profile settings are adequate, the collaborating devices are instructed to apply the profile to the specifications for a job, causing the collaborating devices to free previously allocated resources, determine component resource allotments based on the selected profile, allocate resources for components based on the resource allotments, and perform the job. If adequate profile settings are not identified, an alternate profile is identified. To accomplish this, the system provides a profile list display for review by the operator. If an alternate profile is identified from the profile list, the profile is selected and the device is instructed to apply the profile to the specifications of the job. If an alternate profile is not identified, a new profile is created.

BRIEF DESCRIPTION OF THE DRAWINGS

The foregoing and other features of the embodiments described herein will be apparent and easily understood from a further reading of the specification, claims and by reference to the accompanying drawings in which:

DETAILED DESCRIPTION

Figure 1:
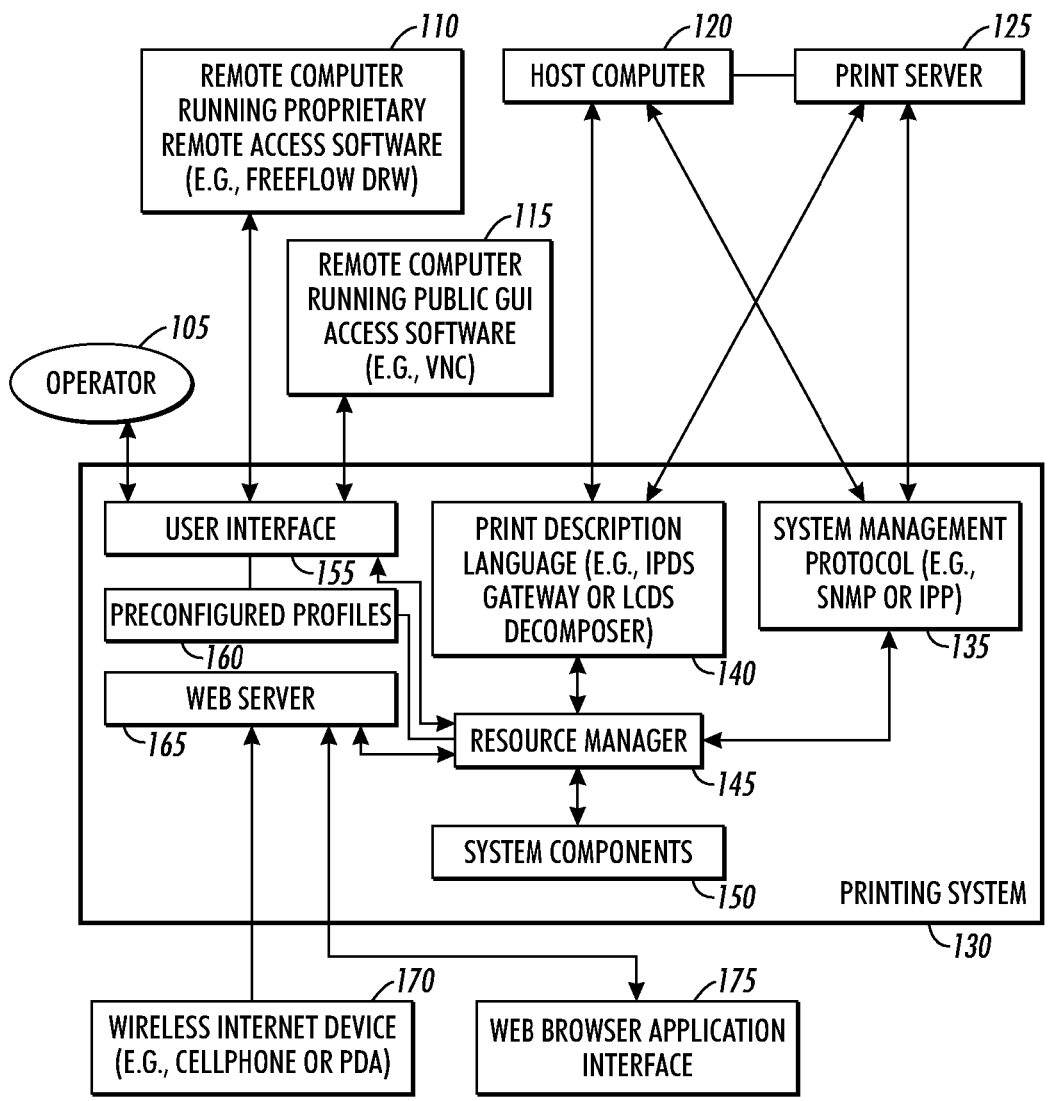
FIG. 1 is a schematic illustration of one embodiment of a system that utilizes resource management profiles.

In the following detailed description, reference is made to the accompanying drawings, which form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the disclosure. The following detailed description is, therefore, not to be taken in a limiting sense.

The method and system for developing and utilizing resource management profiles described herein enables an operator to assign a percentage of memory, or other resources, to each component for printing devices in a network printing system. Rather than using a single hard-coded resource budget, the Resource Profile Manager (RPM) lists feature areas supported by a printing device, and allows the operator to enable or disable specific features. Although the RPM may show resource allocations in absolute terms, it may also provide a graphical user interface (GUI) dialog that would allow the user to set a weighting or percentage for which features would be used most frequently. The system would then use the resulting resource profile to coordinate static allocations of memory, or other resources, for the entire system in an intelligent way, optimizing system response for the stated pattern of feature use. The RPM would also allow the user to save specific resource profiles. This would allow the user to switch easily among well defined profiles, when necessary, to configure the system for specific purposes. For instance, a printer user might select one profile for printing short PostScript, PDF, and PCL jobs, but could easily switch to a different profile, when necessary to optimize the system for printing extremely large IPDS jobs. This approach provides the user with an intuitive means to adjust the resource allocations for the entire system.

While for the purposes of explanation the method and system will be described as functioning within a network including various printing and communication devices, it will be appreciated by those skilled in the art that development and use of resource management profiles may be beneficially utilized in any network environment which requires efficient utilization of system resources. All such variations and modifications are fully contemplated by the scope of the specification and claims herein.

Various computing environments may incorporate capabilities for developing and using resource management profiles to allocate memory or other network resources for efficient operation of printing devices. The following discussion is intended to provide a brief, general description of suitable computing environments in which the method and system may be implemented. Although not required, the method and system will be described in the general context of computer-executable instructions, such as program modules, being executed by a single computer. Generally, program modules include routines, programs, objects, components, data structures, etc., that perform particular tasks or implement particular abstract data types. Moreover, those skilled in the art will appreciate that the method and system may be practiced with other computer system configurations, including hand-held devices, multi-processor systems, microprocessor-based or programmable consumer electronics, networked PCs, mini-computers, mainframe computers, and the like.

The method and system may also be practiced in distributed computing environments where tasks are performed by remote processing devices that are linked through a communication network. In a distributed computing environment, program modules may be located in both local and remote memory storage devices. For example, in a distributed environment, a profile could be submitted at a host that would affect resource allocations not only in an individual printing system, but also in a print server that directed output to a number of printing systems.

Referring to FIG. 1, the block diagram illustrates an example embodiment of a system that provides the capability for resource management using resource profiles. While for the purposes of discussion, the resource management system will be described applied to operation of a printing system, it is noted that the resource management system described herein would also be beneficially applied to coordinate resource management for various types of collaborating devices on a network, for example telecom networks, digital audio or video sequencing programs, etc., all of which are contemplated by the disclosure and scope of the claims herein.

Control of the system may be exercised in a network environment either remotely or through the user interface of an individual device, such as a printer. Among various options for remote operation, the network may include a remote computer 110 running proprietary remote access software, for example, FreeFlow (also known as DocuSP) Remote Workflow, enabling an operator to access the resource management dialog remotely. Alternatively, an operator could also access the resource management dialog remotely through a remote computer 115 running publicly available graphical user interface (GUI) access software, such as Virtual Network Computing (VNC). Remote computers 110 and 115 as well as operator 105, may access the user interface 155 of printing system 130 to control utilization of the resource management profiles. It will be appreciated by those knowledgeable in the art that for the purposes of invoking a predefined resource profile, any remote device capable of communicating with the target system could be used, including a cell phone voice or text message to the device, all of which are contemplated by the scope of the claims herein. All that is necessary to define profiles remotely is a device that is able to provide information (typically, but not necessarily, a visual dialog) for the machine being configured.

Alternatively to accessing profiles and resource management through the user interface 155 of the printing system 130, profiles and resource management capability may reside on a print server 125 or host computer 120. If an operator only had access to a printing system via a print server 125, the print server 125 could provide user and device interfaces to facilitate operation. For those cases in which an operator does not have to configure the system using the print server, the operator could use VNC software, or proprietary remote access software, to access a printer's configuration GUI, while still using print server 125 to manage the flow of print jobs to the printing system. In addition, host computer 120 may provide its own interface for generating profiles for use on connected devices, such as printing system 130. Such profiles could then be transmitted to printing system 130 by means of a protocol or print description language (PDL). For instance, existing standards could be enhanced to allow resource profiles to be sent by means of a PDL such as LCDS or IPDS, or via a system control protocol such as IPP (Internet Printing Protocol), or SNMP (Simple Network Management Protocol).

Printing system 130 includes a resource manager 145, which communicates commands relating to selected resource profiles to system components 150, which control the print function. Resource manager 145 communicates with system management protocol module 135. The System Management protocol module as illustrated in FIG. 1 represents functionality that exists in various Gateways that deal with system configuration, such as SNMP or IPP. SNMP is used by network management systems to monitor network-attached devices for conditions that warrant administrative attention. It consists of a set of standards for network management, including an Application Layer protocol, a database schema, and a set of data objects. SNMP exposes management data in the form of variables on the managed systems, which describe the system configuration. These variables can then be queried (and sometimes set) by managing applications. The information flowing to the Resource Manager module 145 from the system management protocol module 135 may include an actual profile, or information that could be used to construct a profile, depending on how the protocol implemented profile support.

Continuing the example of a configuration using SNMP, the information flowing between the print server 125 and system management protocol module 135 would typically include information about the current printer state, such as what stocks are loaded and whether there are paper jams, etc. Settings for certain attributes may also flow from the print server to the printing system 130. The protocol also may be expanded to allow for the transfer of profiles. Alternatively, in an IPP system, print server 125 sends jobs and job control information to the printer 130 through a Gateway that may be considered to be a System Management Protocol module. This protocol also may be extended to comprehend profiles. In some cases, host systems such as host computer 120 may support SNMP, IPP or other device configuration or control protocols directly without a print server. In such a configuration, host computer 120 may supply profiles to print system 130 along with other system configuration or job data.

Resource manager 145 also communicates with print description language interpreter module 140. Print description language interpreter (PDL) module 140 uses the commands and data in a print data stream to generate the raster data which eventually gets printed. There may be a number of different PDL interpreters in a system, allowing the system to handle a variety of print languages, such as IPDS, LCDS, PostScript, PCL, etc. The Resource Manager informs each PDL interpreter how much resource space it can use, depending on the settings in the resource profile. From print server 125 the PDL interpreter module 140 receives a data stream consisting of commands and data for printing system 130. Typically print server 125 would pass the data stream to a Gateway, within the printing system, which would then forward the information to the PDL interpreter 140. The printing system is not generally aware of whether it is communicating with a print server or a host computer, such as 120. The print server is used as a means to either offload work from the host computer or to provide additional features, such as data stream conversions not offered by the host computer. Thus, host computer 120 provides the same types of data and commands that would be transmitted by a Print Server.

Preconfigured profiles module 160 provides a library of preconfigured resource utilization profiles for defined tasks. The allocations may relate to various system operations. For example, the time slices allotted to different processes on a computer could be modified to maximize efficiency, or memory allocations could be made based on various task types. Alternatively, access to processors in a multiprocessor system could be allocated, by means of profiles, to focus computing resources on the highest priority tasks. These profiles are made available to the resource manager 145 and user interface 155. User interface 155, in the form of a GUI, enables an operator to communicate directly with the printer or via a remote source. The Resource Manager 145 receives the profile data from the user interface 155 and provides information to user interface 155 about what components are available in the system, so that user interface 155 can construct its display dynamically to reflect participating elements.

Web server 165 enables communication with the internet and enables access to the printing system by a wireless internet device, such as a cellphone or personal data assistant 170, which may communicate commands relating to selected resource profiles to web server 165 and thus to resource manager 145. Web browser application interface 175 communicates with web server 165 and provides interfaces for job submission, control, and management, as well as interfaces for system configuration, including profile creation and submission. A user could access these features by means of an external web browser.

Figure 2:
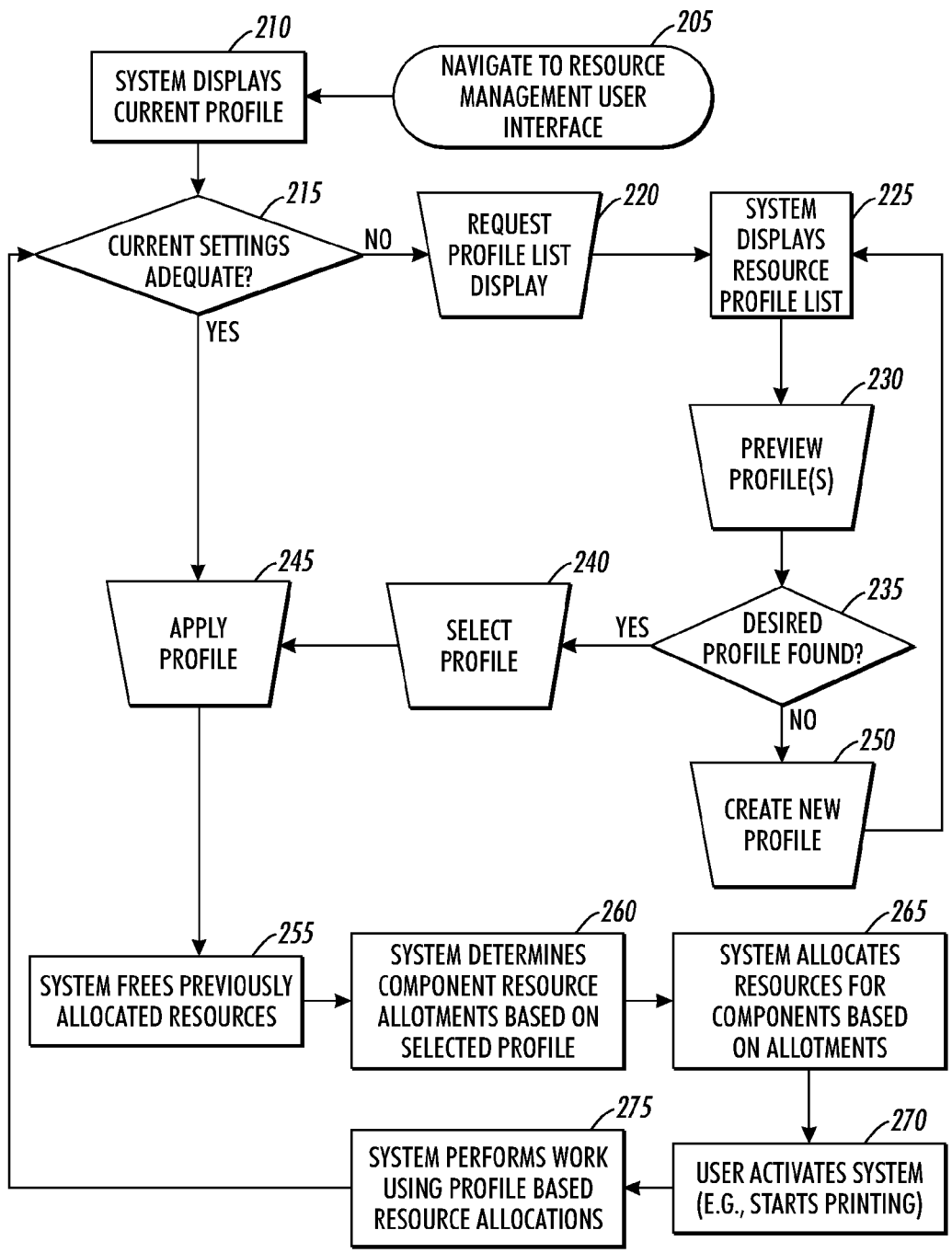
FIG. 2 is a flowchart illustrating an example embodiment of a method for resource management utilizing resource profiles.

Turning now to FIG. 2, the flowchart illustrates an example embodiment of the method for resource management utilizing resource profiles. At 205 an operator navigates to the resource management user interface either remotely, through various devices, or directly with the user interface of the printer. The GUI displays the current profile active on the system at 210. If the current settings are adequate for the task to be performed, the user instructs the system to apply the profile at 245. The system then frees previously allocated resources at 255 and determines component resource allotments based on the selected profile at 260. The system allocates resources for the components based on the allotments at 265. The operator activates the system at 270 to initiate printing. The system performs the task using the profile based on the resource allocations at 275.

Alternatively if the operator determines at 215 that the current settings are not adequate, the operator requests the profile list display at 220. The system displays the resource profile list at 225 and the operator selects one or more profiles to preview at 230. If the desired profile has been found at 235, the operator selects the profile at 240. The selected profile is applied at 245. The system then frees previously allocated resources at 255 and determines component resource allotments based on the selected profile at 260. The system allocates resources for the components based on the allotments at 265. The operator activates the system at 270 to initiate printing. The system performs the task using the profile based on the resource allocations at 275.

If the operator determines at 235 that the desired profile has not been identified, the operator creates a new profile at 250. The new profile is added to the resource profile list, which is displayed at 225. The operator again reviews the profiles at 230, identifies the desired new profile at 235, and selects the new profile at 240. The selected profile is applied at 245. The system then frees previously allocated resources at 255 and determines component resource allotments based on the selected profile at 260. The system allocates resources for the components based on the allotments at 265. The operator activates the system at 270 to initiate printing. The system performs the task using the profile based on the resource allocations at 275.

Figure 3:
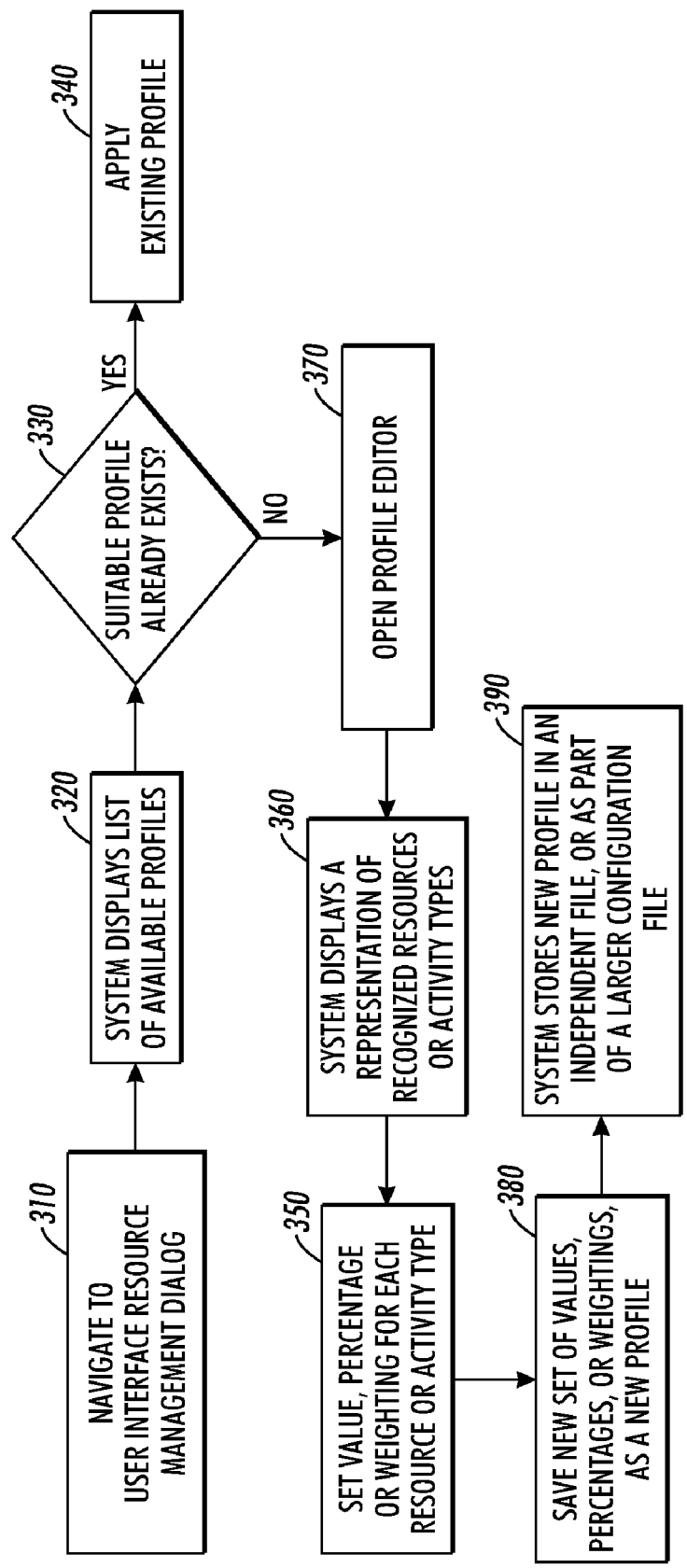
FIG. 3 is a flowchart illustrating an example embodiment of a method for creation of resource profiles by a system administrator.

Referring now to FIG. 3, the flowchart illustrates an example embodiment of the method for creation of new resource profiles by a system administrator or other operator. The printing system would be delivered with a default resource management profile, with a selection of values for general system use. When necessary to optimize system performance, the system administrator would open the resource profile manager GUI dialog, and adjust the profile to reflect expected use of the machine, thus creating a new profile. Because some machines are used for differing purposes on a regular basis, to obtain the best performance from such systems, the system administrator may prepare and save a separate profile specifically targeted to each application. Then when the application is to be run, the system administrator, or the operator, could load the appropriate profile and restart the machine, optimizing it for the task at hand. For example, the system could be optimized to provide a large amount of memory to the IPDS subsystem when running large transactional IPDS jobs, but this memory could be made available for other purposes when the profile indicates IPDS is not in use. At 310 the system administrator navigates to the user interface resource management interface. The system displays a list of available profiles at 320. If a suitable profile already exists at 330, the system administrator applies the existing profile at 340, as discussed with reference to FIG. 2 herein. If a suitable profile does not exist, the system administrator prepares to edit a profile by opening the profile editor at 370. The system displays a representation of recognized resources or activity types at 360. The system administrator sets the value, percentage, or weighting for each resource or activity type at 350. At 380 the system administrator saves the new set of values, percentages, or weightings, as a new profile. The system stores the new profile in an independent file, or as a part of a larger configuration file, at 390. A configuration file stores the values of internal settings or user selections. Such a file may be used either at system start up, or during normal processing, when the system needs to retrieve the value of one or more variables. Complex systems, such as FFPS (DocuSP), may have multiple configuration files for use by various components or subsystems.

Figure 4:
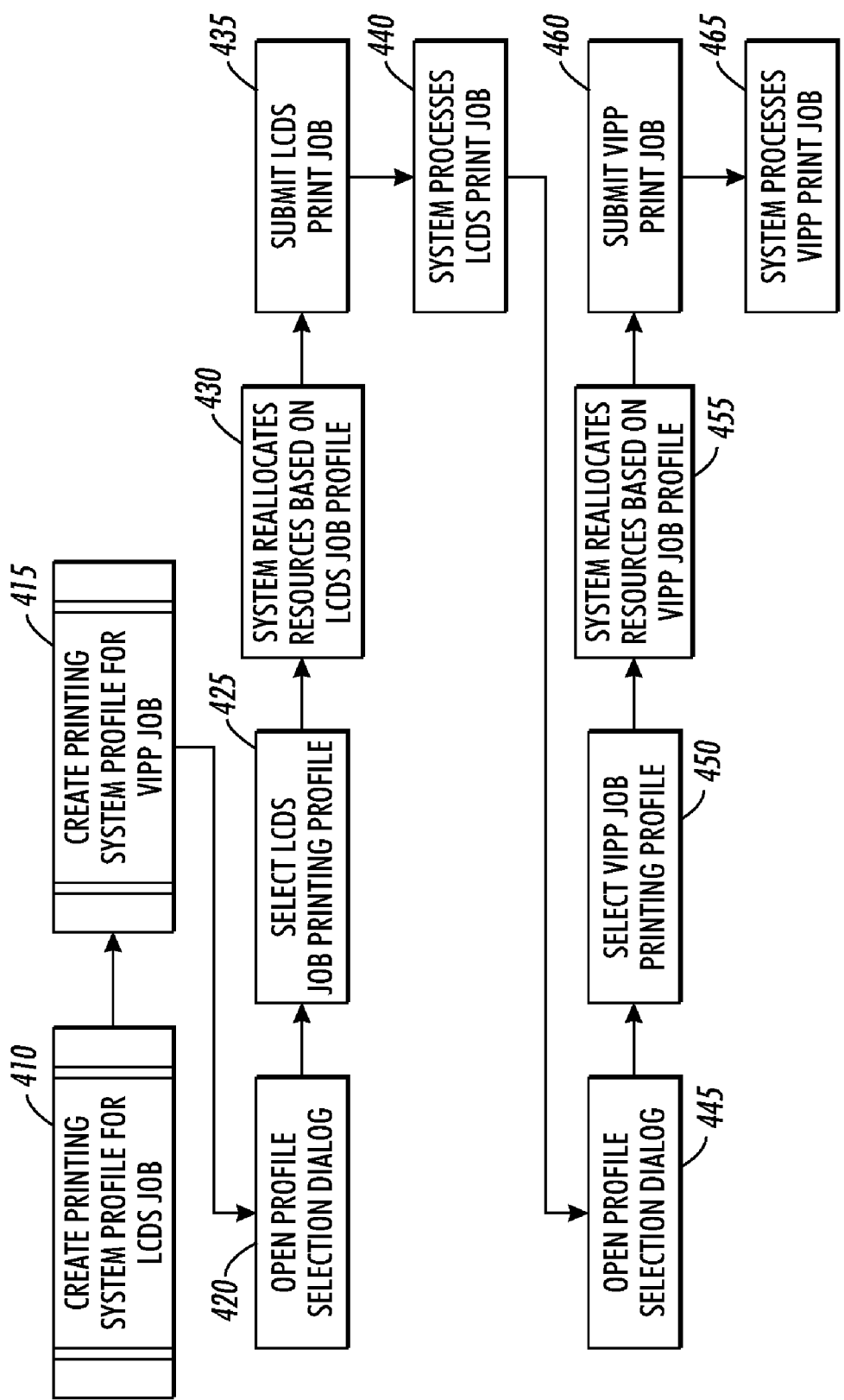
FIG. 4 is a flowchart illustrating an example embodiment of a method for applying alternate resource profiles in a resource management system.

Turning now to FIG. 4, the flowchart illustrates an example embodiment of the method for switching resource profiles among print jobs. At 410 the system administrator creates a printing system resource profile for an LCDS (Line Conditioned Data Stream) job. The system administrator creates a printing system profile for a VIPP (Variable Data Intelligent Postscript Printware) job at 415. The system administrator or operator opens the profile selection dialog screen on a user interface at 420 and selects the LCDS job printing profile at 425. The system reallocates resources based on the LCDS job profile at 430. The operator submits the LCDS print job at 435 and the system processes the LCDS print job at 440. To switch to an alternate profile, the operator opens the profile selection dialog screen at 445. The operator selects the VIPP job printing profile at 450. The system reallocates resources based on the VIPP job profile at 455. The operator submits the VIPP print job at 460 and the system processes the VIPP print job at 465. While this procedure has been illustrated with respect to LCDS and VIPP profiles, it is noted that the method may be applied to any system profile, all of which are contemplated by the scope of the disclosure and claims herein.

Figure 5:
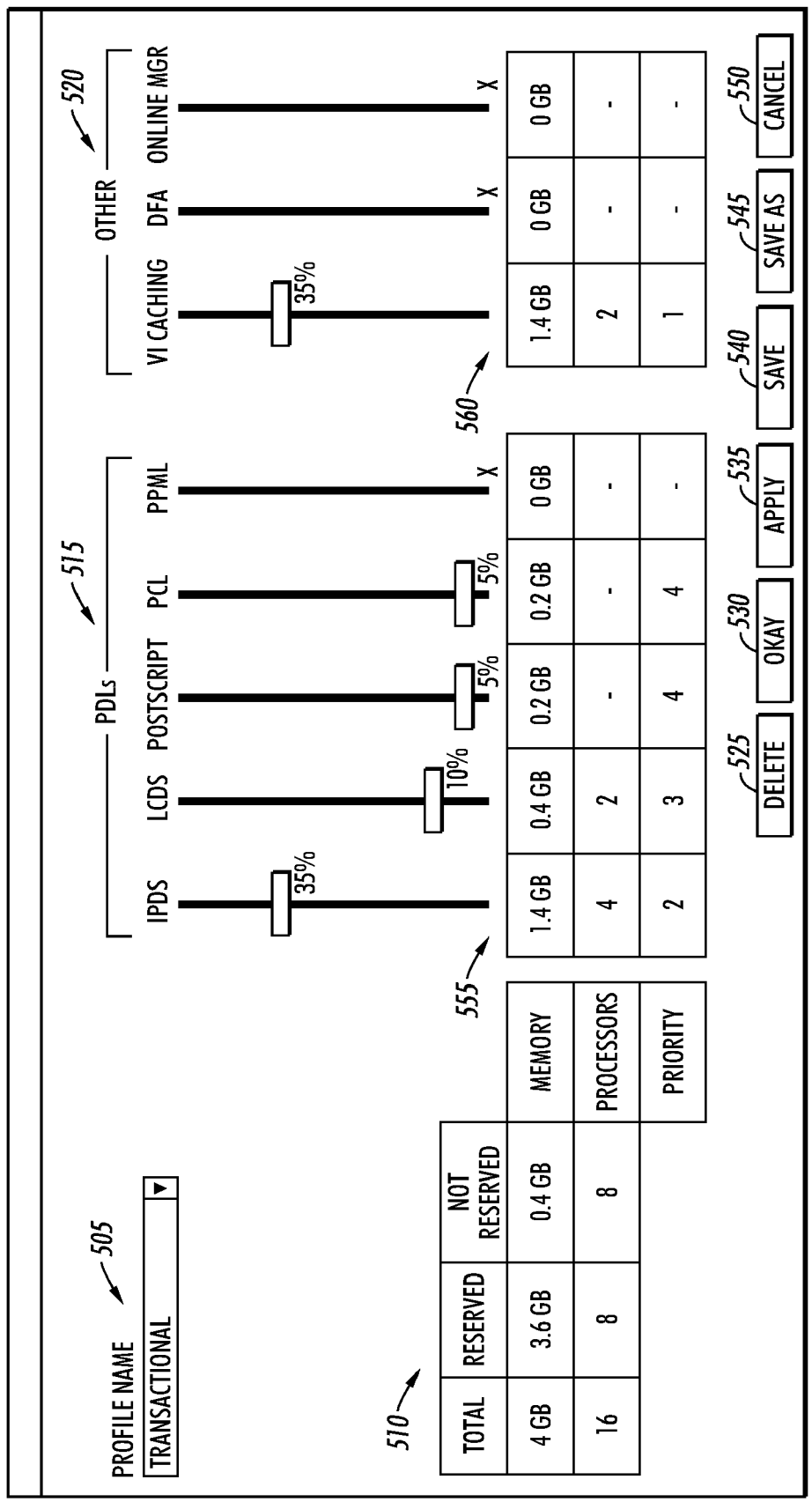
FIG. 5 is an illustration of an example embodiment of a user interface utilized for resource profile management.

Turning now to FIG. 5, an example embodiment of a GUI for resource profile management is illustrated. While various approaches may be utilized for a user interface, one possible embodiment is illustrated in FIG. 5. As depicted in the figure the system administrator or operator may select a profile name 505 from a drop-down list, which may have various entries for different purposes. For the purposes of this illustration, the "Transactional" profile has been selected. Listing 515 provides the various PDL (Page Description Language) job types available. As depicted in the figure, the operator would move slider controls to set memory percentages for specific job types. The user interface may be based on percentages in such a way that adding to one element would force the percentage allocated to other elements to be reduced, so that the total allocation never exceeded 100%. Alternatively, a weighting scheme could be used that would set relative values that the resource profile manager would later use to determine the actual percentage. With either approach the operator would determine the overall profile for the entire system.

For the purposes of this embodiment, the PDLs included are IPDS (Intelligent Printer Data Stream), LCDS (Line Conditioned Data Stream), PostScript, PCL (Printer Control Language), and PPML (Personalized Print Markup Language). Listing 520 presents other available features. In addition to tuning the system for specific PDLs, resource allocations for other features could also be controlled by the profile, as illustrated in 520. The example shows features, such as Variable Information (VI) caching, Document Feeding and Finishing Architecture (DFA) support, and Online Channel interface, as typical examples of printing system components which might require resource allocations. However, the principle could be extended to any component in the system requiring resources. Table 555 presents the amount of memory reserved for processing each supported PDL, based on the slider settings, the number of processors being used, and the task priority. Similarly, table 560 presents the amount of memory reserved for each of the other task types based on the slider settings, the number of processors being used, and the task priority. Table 510 summarizes the memory and processor usage for the system, including the total memory and processors available, the amount of memory and processors reserved for the specified task types, and the amount of memory and processors not yet reserved.

The operator may delete a profile by selecting 'Delete' button 525. If the operator is satisfied with the current settings, 'Okay' button 530 may be selected. If the operator has revised a profile and desires the revised profile to replace the original profile, 'Save' icon 540 is utilized. Alternatively, if the operator desires to retain the original profile and save the new profile, 'Save As' icon 545 is selected. To apply the settings to the job to be processed, the 'Apply' button 535 is selected. 'Cancel' button 550 enables the operator to cancel any revisions made. Any of numerous approaches known in the art may be utilized to adjust percentages and select buttons 525, 530, 535, 540, 545, and 550 on the user interface. For the purposes of this discussion, a fully-featured interface is illustrated in FIG. 5. Those skilled in the art will appreciated that alternate embodiments, including more simpler forms of the interface that are directed to relative allocations, are also possible. All such variations of the interface are fully contemplated by the specification and scope of the claims herein.

While the present discussion has been illustrated and described with reference to specific embodiments, further modification and improvements will occur to those skilled in the art. Additionally, "code" as used herein, or "program" as used herein, is any plurality of binary values or any executable, interpreted or compiled code which can be used by a computer or execution device to perform a task. This code or program can be written in any one of several known computer languages. A "computer", as used herein, can mean any device which stores, processes, routes, manipulates, or performs like operation on data. It is to be understood, therefore, that this disclosure is not limited to the particular forms illustrated and that it is intended in the appended claims to embrace all alternatives, modifications, and variations which do not depart from the spirit and scope of the embodiments described herein.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. In a computer-controlled printing system in a networked environment, a resource management graphical user interface, which, when accessed and utilized by an operator, causes the computer to perform method steps for controlling the printing system to enable an operator to create, modify, and apply resource management profiles to coordinate resource allocation within the printing system, the method comprising:

displaying, upon receiving a request, at least one current resource management profile, wherein said resource management profile comprises printing system resource allocations associated with specific tasks;

providing a resource profile list, wherein said profile list includes at least one profile name, wherein said profile name comprises a task type;

presenting jobs associated with said task type, wherein controls are provided to enable the operator, to set allocations for component resource usage;

providing a summary of said component resource allocations for said task type, wherein said component resource allocations are modifiable;

presenting operational options to the operator, wherein said operational options include at least one member of the group comprising delete a profile, approve a profile, apply a profile to a print job or series of print jobs, save a new profile, replace an existing profile, and cancel a profile modification; and transmitting an instruction to apply said profile to a printing system for processing of at least one print job.

2. The graphical user interface according to claim 1, wherein said component allocations include at least one member selected from the group comprising IPDS, LCDS, PostScript, PCL, PPML, Variable Information Caching, DFA (document feeding and finishing architecture) support, and Online Channel interface.

3. The graphical user interface according to claim 1, wherein said component allocations are modified by setting percentages per job type or by use of a weighting scheme.

4. The graphical user interface according to claim 1, wherein said graphical user interface may be accessed through at least one member selected from the group comprising a printer interface, a remote computer, a print server, a host computer, an internet device, and a wireless internet device.

5. A method for computer control of collaborating devices in a networked environment to enable an operator to access a resource management graphical user interface to create, modify, and apply resource management profiles to coordinate resource allocation among the collaborating devices, the method comprising:

navigating to the resource management graphical user interface;

reviewing a current resource management profile, wherein said profile includes collaborating device resource allocation settings associated with specific tasks;

determining whether said current profile settings are adequate to efficiently perform a job;

if said current profile settings are adequate to efficiently perform said at least one job, instructing the collaborating device to apply said profile to the specifications for said job, wherein said instruction causes said collaborating device to free previously allocated resources, determine component resource allotments based on said selected profile, allocate resources for components based on said resource allotments, and perform said at least one job using said selected profile based resource allocations;

if said current profile settings are not adequate to efficiently perform said at least one job, identifying an alternate profile, comprising:

requesting a profile list display, wherein said profile list display includes at least one profile name, wherein said profile name comprises a task type;

reviewing selected profiles associated with said profile name;

determining if at least one profile associated with said profile name satisfies profile setting requirements for said at least one job;

selecting said profile that satisfies said profile setting requirements; and instructing the collaborating device to apply said selected profile to the specifications for said at least one job, wherein said instruction causes said collaborating device to free previously allocated resources, determine component resource allotments based on said selected profile, allocate resources for components based on said resource allotments, and perform said at least one job using said selected profile based resource allocations; and if at least one profile associated with said profile name does not satisfy said profile setting requirements for said at least one job, creating a new profile.

6. The method according to claim 5, wherein said collaborating device comprises a printing system.

7. The method according to claim 6, wherein the resource management graphical user interface may be accessed through at least one member selected from the group comprising a printer interface, a remote computer, a print server, a host computer, an internet device, and a wireless internet device.

8. The method according to claim 7, wherein said remote computer is operating proprietary remote access software or publicly available graphical user interface access software.

9. The method according to claim 6, wherein said print server provides the resource management graphical user interface.

10. The method according to claim 6, further comprising switching resource profiles among print jobs.

11. The method according to claim 10, wherein switching resource profiles among print jobs comprises:

creating a first printing system profile for a first job type;

creating a second printing system profile for a second job type;

accessing the profile selection capability on the resource management graphical user interface;

selecting said first printing system profile, wherein said selection causes said printing system to reallocate resources based on said first printing system profile and process said first job based on said first printing system profile;

re-accessing said profile selection capability on the resource management graphical user interface; and selecting said second printing system profile, wherein said selection causes said printing system to reallocate resources based on said second printing system profile and process said second job based on said second printing system profile.

12. The method according to claim 5, wherein said host computer provides the resource management graphical user interface for management of profiles.

13. The method according to claim 5, wherein said wireless internet device comprises at least one device capable of providing information through voice or text messaging for the system being configured.

14. The method, according to claim 5, wherein said internet device comprises at least one device capable of providing information through a web browser interface for the system being configured.

15. The method according to claim 5, wherein said profile list display comprises profiles from at least one library of preconfigured resource allocations for defined tasks.

16. The method according to claim 15, wherein said resource allocations relate to various collaborating device operations.

17. The method according to claim 16, wherein said resource allocations comprise at least one member selected from the group comprising time slices allotted to specific processes, memory allocations based on various task types, and access to processors allocated according to task priority.

18. The method according to claim 5, wherein creating a new profile comprises:

navigating to the resource management graphical user interface;

reviewing at least one list of available profiles displayed on the graphical user interface;

determining if a suitable profile already exists;

if a suitable profile exists, applying said suitable profile; and if a suitable profile does not already exist, creating a new profile, comprising:

accessing the profile editor on the resource management graphical user interface;

reviewing a representation of recognized resources or activity types displayed on the resource management graphical user interface;

setting a value for each resource or activity type to create a set of values, wherein said value comprises a percentage or weighting for each resource or activity type;

saving said set of values as a new profile; and storing said new profile.

19. The method according to claim 18, wherein said new profile is stored in an independent file or as part of a larger configuration file.

20. A system for computer control of collaborating devices in a networked environment to enable an operator to access a resource management graphical user interface to create, modify, and apply resource management profiles to coordinate resource allocation among the collaborating devices, the system comprising:

means for navigating to the resource management graphical user interface;

means for reviewing a current resource management profile, wherein said profile includes device resource allocation settings associated with specific tasks;

means for determining whether said current profile settings are adequate to efficiently perform at least one job;

if said current profile settings are adequate to efficiently perform said at least one job, means for instructing the collaborating devices to apply said profile to the specifications for said job, wherein said instruction causes said collaborating devices to free previously allocated resources, determine component resource allotments based on said selected profile, allocate resources for components based on said resource allotments, and perform said at least one job using said selected profile based resource allocations;

if said current profile settings are not adequate to efficiently perform said at least one job, means for identifying an alternate profile, comprising:

means for requesting a profile list display, wherein said profile list display includes at least one profile name, wherein said profile name comprises a task type;

means for reviewing selected profiles associated with said profile name;

means for determining if at least one profile associated with said profile name satisfies profile setting requirements for said at least one job;

means for selecting said profile that satisfies said profile setting requirements; and means for instructing the collaborating devices to apply said selected profile to the specifications for said at least one job, wherein said instruction causes said collaborating devices to free previously allocated resources, determine component resource allotments based on said selected profile, allocate resources for components based on said resource allotments, and perform said at least one job using said selected profile based resource allocations; and if at least one profile associated with said profile name does not satisfy said profile setting requirements for said at least one job, means for creating a new profile.

21. The system according to claim 20, wherein said collaborating device comprises a printing system.

22. The system according to claim 21, further comprising means for switching resource profiles among print jobs.

23. The system according to claim 22, wherein means for switching resource profiles among print jobs comprises:

means for creating a first printing system profile for a first job type;

means for creating a second printing system profile for a second job type;

means for accessing the profile selection capability on the resource management graphical user interface;

means for selecting said first printing system profile, wherein said selection causes said printing system to reallocate resources based on said first printing system profile and process said first job based on said first printing system profile;

means for re-accessing said profile selection capability on the resource management graphical user interface; and means for selecting said second printing system profile, wherein said selection causes said printing system to reallocate resources based on said second printing system profile and process said second job based on said second printing system profile.

24. The system according to claim 20, wherein means for creating a new profile comprises:

means for navigating to the resource management graphical user interface;

means for reviewing at least one list of available profiles displayed on the graphical user interface;

means for determining if a suitable profile already exists;

if a suitable profile exists, means for applying said suitable profile; and if a suitable profile does not already exist, means for creating a new profile, comprising:

means for accessing the profile editor on the resource management graphical user interface;

means for reviewing a representation of recognized resources or activity types displayed on the resource management graphical user interface;

means for setting a value for each resource or activity type to create a set of values, wherein said value comprises a percentage or weighting for each resource or activity type;

means for saving said set of values as a new profile in memory; and means for storing said new profile.

25. The system according to claim 20, wherein the resource management graphical user interface may be accessed through at least one member selected from the group comprising a collaborating device interface, a remote computer, a device server, a host computer, an internet device, and a wireless internet device.

\* \* \* \* \*